(12) United States Patent
Holzapfel

(10) Patent No.: US 6,430,532 B2
(45) Date of Patent: Aug. 6, 2002

(54) DETERMINING AN ADEQUATE REPRESENTATIVE SOUND USING TWO QUALITY CRITERIA, FROM SOUND MODELS CHOSEN FROM A STRUCTURE INCLUDING A SET OF SOUND MODELS

(75) Inventor: Martin Holzapfel, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/934,991

(22) Filed: Aug. 21, 2001

Related U.S. Application Data

(63) Continuation of application No. PCT/DE00/00601, filed on Mar. 1, 2000.

(30) Foreign Application Priority Data

Mar. 8, 1999 (DE) ......................... 199 10 043

(51) Int. Cl.⁷ ..................... G10L 13/06; G10L 15/14

(52) U.S. Cl. ................... 704/258; 704/266; 704/256

(58) Field of Search .................. 704/256, 258, 704/266

(56) References Cited

U.S. PATENT DOCUMENTS 6,163,769 A * 12/2000 Acero et al. ............... 704/260
6,173,263 B1 * 1/2001 Conkie ...................... 704/260

FOREIGN PATENT DOCUMENTS

| DE | 196 39 844 A1 | 4/1998 |
| EP | 0 535 380 B1 | 1/1998 |
| EP | 0 953 970 A2 | 4/1999 |

OTHER PUBLICATIONS

Andrew J. Hunt et al. "Unit Selection in a Concatenative Speech Synthesis System Using a Large Speech Database", Proc. IEEE ICASSP 1996, vol. 1, p. 373–376, May 1996.*
Ernst Günter Schukat–Talamazzini: "Automatische Spracherkennung" ("Automatic Speech Recognition"), Vieweg & Sohn Verlagsgesellschaft mbH, Braunschweig/Wiesbaden, 1995, pp. 125–139.
R. E. Donovan et al.: "Automatic Speech Synthesiser Parameter Estimation using HMMs", Proceedings of the International Conference on Acoustics, Speech and Signal Processing (ICASSP), US, New York, IEEE 1995, pp 640–643.
L. R. Bahl et al.: "Fast March for Continuous Speech Recognition using Allophonic Models", Proceedings of the International Conference on Acoustics, Speech and Signal Processing (ICASSP), US, New York, IEEE Bd. Conf. 17, 1992, pp I–17 through I–20.

* cited by examiner

Primary Examiner—Tălivaldis Ivars Smits
(74) Attorney, Agent, or Firm—Laurence A. Greenberg; Werner H. Stemer; Gregory L. Mayback

(57) ABSTRACT

A method determines a representative sound on the basis of a structure which includes a set of sound models. Each sound model has at least one representative for the modeled sound. In the structure, a first sound model, matching with regard to a first quality criterion, is determined from the set of sound models. At least one second sound model is determined from the set of sound models dependent on a characteristic state criterion of the structure. At least some of the representatives of the first sound model and of the at least one second sound model are assessed in addition to the first quality criterion with regard to a second quality criterion. The at least one representative which has an adequate overall quality criterion with regard to the first and second quality criteria is determined as a representative sound from the representatives of the first sound model and the at least one second sound model.

24 Claims, 5 Drawing Sheets

DETERMINING AN ADEQUATE REPRESENTATIVE SOUND USING TWO QUALITY CRITERIA, FROM SOUND MODELS CHOSEN FROM A STRUCTURE INCLUDING A SET OF SOUND MODELS

CROSS-REFERENCE TO RELATED APPLICATION

This application is a continuation of copending International Application No. PCT/DE00/00601, filed Mar. 1, 2000, which designated the United States.

BACKGROUND OF THE INVENTION

Field of the Invention

The invention relates to a method and a configuration for producing a sound.

Such a configuration and such a method are known from R. E. Donovan et al.: "Automatic Speech Synthesiser Parameter Estimation using HMMs", IEEE 1995, pages 640–643; hereinafter "Donovan et al." This publication discloses the production of a decision tree, for its part permitting a cluster formation for the modeling of triphones. For this purpose, a series of questions, which relate directly to a phonetic context and can be answered with yes or no, is used. Each answer sets up a further subtree. Consequently, training data of naturally spoken speech are projected onto the branches and finally leaves of the decision tree.

The decision tree is used for calculating the leaves to be used in order to determine hidden Markov models for all possible triphones not covered by the training data.

Hidden Markov models (HMM) for the modeling of sounds are known from E. G. Schukat-Talamazzini: *Automatische Spracherkennung —Grundlagen, statistische Modelle und effiziente Algorithmen* [Automatic Speech Recognition—Principles, Statistical Models And Efficient Algorithms], Vieweg & Sohn Verlagsgesellschaft mbH, Brunswick/Wiesbaden 1995, pages 125-139. In the linguistic production of a word, the constituent sounds are realized with variable duration and in varying spectral composition. Dependent on the rate and rhythm of the speech, each individual phonetic segment of the utterance is allotted an unpredictable number of feature vectors; each vector includes not only its phonetic content but also information components relating to the speaker, ambience and slurring, which make identification of the sounds significantly more difficult.

These conditions can be modeled in a simplified form by a two-stage process, as FIG. 1 shows by the example of the word "haben" [have]. For the phonemes of the word, a corresponding number of states 102 to 106 are reserved in the model and are run through along the direction of the arrow 101 for producing speech. At every time pulse, it is possible to remain in the current state or transfer to the succeeding state; the system behaves randomly and is determined by the transfer probabilities 107 to 111 depicted. For example, the state 103 belonging to the phoneme /a/ is adopted over a number of successive brief analysis intervals (on average over ten), whereas realizations of the plosive /b/ take less time.

While the first stage described of the random process models the time distortion of different pronunciation variants, a second stage serves for sensing spectral variations. Linked to each state of the word model is a statistical output function that weights the phonetic realization alternatives. In the example of FIG. 1, for the production of the phoneme /a/ not only the actually matching phone class 113 but also the phone class 114 is permitted with a positive probability (here: 0.1). The phone class 118 is likewise permitted for the production of the phoneme /n/ with a probability of 0.3. The formalism described also allows a description of an optional sound elimination, expressed by the "bridging" 119 of the state 105 by a direct transfer between the states 104 and 106. The bridging is given a probability of 0.2 by way of example.

The transfer probabilities of the hidden Markov model can be determined based on training data. When it has been fully trained, the HMM represents a blueprint for the production of sequences of sounds (cf. Schukat-Talamazzini, pages 127–139). One method of training the HMM is to use the Baum-Welch algorithm.

However, in the method described in Donovan et al. it is disadvantageous that, in the decision tree, only the leaves respectively found are used for the sound modeling.

SUMMARY OF THE INVENTION

It is accordingly an object of the invention to provide a method and configuration for determining a representative sound, method for synthesizing speech, and method for speech processing that overcomes the hereinaforementioned disadvantages of the heretofore-known devices of this general type and that, when determining a representative sound (from a large number of sounds), accounts for not only a structure, devised according to predetermined criteria, but also a characteristic state criterion of this structure.

With the foregoing and other objects in view, there is provided, in accordance with the invention, a method for determining a representative sound based on a structure. The first step of the method is forming, from a sound, a structure having a characteristic state criterion. The next step is providing a set of sound models, each sound model having a representative with a plurality of quality criterion. The next step is determining, in the structure, a first sound model from the set of sound models matching a first quality criterion. The next step is determining a second sound model from the set of sound models depending on the characteristic state criterion of the structure. The next step is forming an overall quality criterion for each representative by assessing representatives of the first and the second sound model with regard to a second quality criterion in addition to the first quality criterion. The next step is determining a representative having an adequate overall quality criterion with regard to the first and second quality criteria as a representative sound.

In the method for determining a representative sound based on a structure that includes a set of sound models, each sound model has at least one representative for the modeled sound. In the structure, a first sound model, matching with regard to a first quality criterion, is determined from the set of sound models. Dependent on a characteristic state criterion of the structure, at least one second sound model is determined from the set of sound models. Representatives of the first sound model and of the at least one second sound model are assessed in addition to the first quality criterion with regard to a second quality criterion. From the representatives of the first and the at least one second sound model, that at least one representative which has an adequate overall quality criterion with regard to the first and second quality criteria is determined as a representative sound.

In accordance with how the structure is ordered, a search is conducted within the structure for a matching sound model for the sound to be produced. In this case, "matching" applies with regard to the first quality criterion, which is predetermined in particular by the structure.

The structure may be configured as a tree structure, preferably as a binary tree. Such a tree structure has nodes (for the embodiment of the sound models), branches (for the hierarchical subdivision of the sound models dependent on the criteria on the basis of which the structure is constructed) and leaves (nodes from which no further branch extends).

The structure constructed based on predetermined criteria is then used in order to determine, depending on the characteristic state of the structure (in particular the tree structure) at least one second sound model from the set of sound models. In this case, the characteristic state criterion in the structure may be a measure of distance from the first sound model. In the case of the binary tree as the structure, all the sound models within a predetermined distance from the first sound model may be regarded as second sound models. Here, the term "distance" is not necessarily to be interpreted in the local sense; rather, the "distance" may also concern a dimension of distance with regard to one or more predetermined criteria.

With the first sound model and a set of second sound models that satisfy the characteristic state criterion and have the predetermined distance from the first sound model, a second quality criterion is determined for the representatives of the sound models. The overall quality criterion for each representative is made up of the first and the at least one second quality criteria. A candidate among the representatives that is suitable for producing the sound is determined by its "adequate" overall quality criterion that is an overall quality criterion that has a predetermined minimum value.

A development of this is that the overall quality criterion is an arithmetic combination of the quality criteria.

In particular, it is a development that a representative of the at least one second sound model is additionally provided with a reduced quality, resulting from the characteristic state criterion, in comparison with a representative of the first sound model. Here, the distance mentioned above of the at least one second sound model from the first sound model is preferably used: a great distance indicates a great deviation from the first sound model, originally found as matching according to the structure. For such a great distance, a kind of "penalty" is awarded for the representative of the at least one second sound model, this penalty having an effect on the overall quality criterion.

One refinement is that a best representative, with regard to the overall quality criterion, is determined as the representative sound.

Another refinement is that the structure is devised based on at least one of the following criteria:
  a) linguistic criteria, for example grammatical properties of a word;
  b) articulatory criteria, in particular the location of the articulation; and
  c) phonetic criteria, for example classified on the basis of plosive or nasal sounds.

An additional development is that the sound may be formed as one of the following possibilities:
  a) phoneme,
  b) biphone,
  c) triphone,
  d) syllable,
  e) combination of syllables,
  f) word,
  g) combination of words.

It is also a refinement that, whenever the sound represents a combination of sounds, a construction of the structure takes place on the basis of context criteria of the sound within the combination of sounds. This means in particular that, in the case of a combination of sounds, questioning of the kind "Is the sound to the left of the current sound a vowel?" or "Is the sound to the left of the current sound a plosive?" can in each case be answered with YES or NO and consequently the context to the right or left is used for constructing the structure, in particular the binary tree.

Within an additional refinement, the sound model takes the form of a hidden Markov model (HMM).

A development is that a selection of n representatives which, based on their overall quality criterion, are in each case best suited for determining the representative sound is represented. The number n can in this case be predetermined application-dependently; the best representatives are preferably presented in the form of a list.

Furthermore, it is a refinement that the first sound model is determined for the determination of the representative sound as soon as no improvement of the first quality criterion can be achieved any longer by a further search in the structure—in particular the tree structure.

Another refinement is that the first sound model is determined as soon as fewer representatives than are required for the determination of the representative sound are available with respect to a sound model from the set of sound models with a possibly better first quality criterion. In other words, in the search for an adequately good first sound model, only those sound models that comprise more representatives than is predetermined by a threshold value are taken into account.

Within a further refinement, a fuzzy logic assessment is performed for each second quality criterion. As a result, it is ensured that for each second quality criterion an own assessment is performed, carried out in particular in a normalized manner with regard to comparability with other assessments. Fuzzy logic provides a suitable method for such a normalized assessment.

In accordance with a further object of the invention, the method described above can be used in speech processing, in particular in speech synthesis.

Also provided for achieving the object is a configuration for determining a representative sound based on a structure that comprises a set of sound models. Each sound model has at least one representative for the modeled sound. The configuration has a processor unit that is set up in such a way that
  a) in the structure, a first sound model, matching with regard to a first quality criterion, can be determined from the set of sound models;
  b) dependent on a characteristic state criterion of the structure, at least one second sound model can be determined from the set of sound models;
  c) representatives of the first and the at least one second sound model can be assessed in addition to the first quality criterion with regard to a second quality criterion;
  d) that at least one representative which has an adequate overall quality criterion with regard to the first and second quality criteria can be determined as a representative sound.

This configuration is suitable in particular for carrying out the method according to the invention or one of its developments explained above.

Other features that are considered as characteristic for the invention are set forth in the appended claims.

Although the invention is illustrated and described herein as embodied in a method and configuration for determining a representative sound, method for synthesizing speech, and method for speech processing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
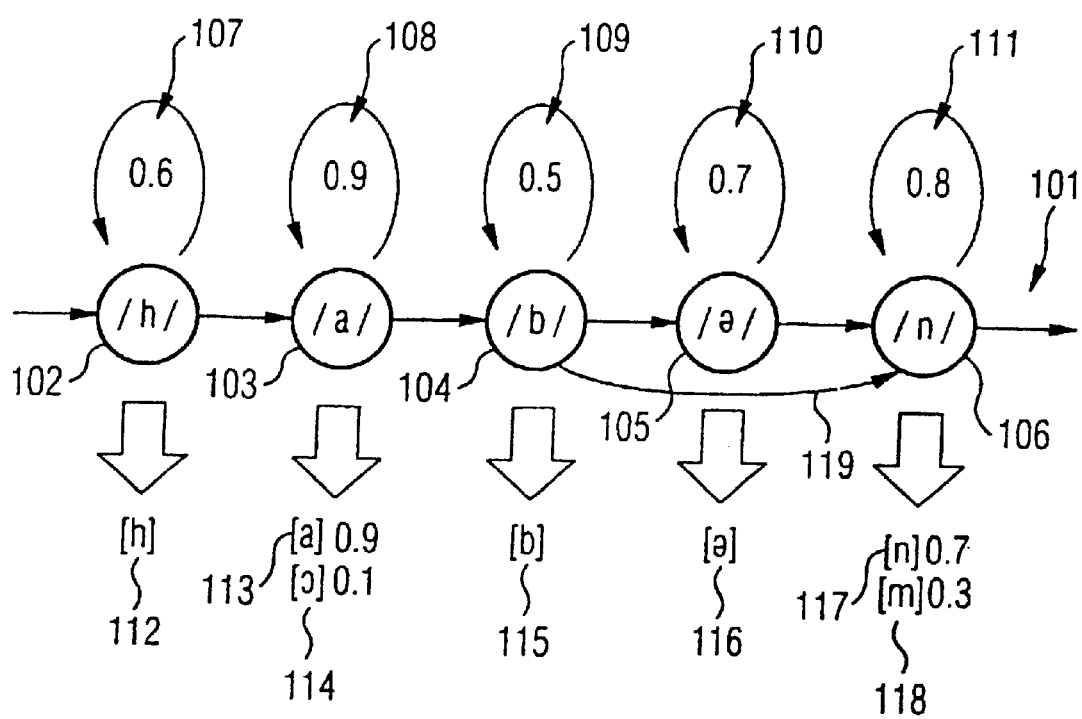
FIG. 1 shows a diagram for speech modeling by HMM.

In all the figures of the drawing, sub-features and integral parts that correspond to one another bear the same reference symbol in each case.

Figure 2:
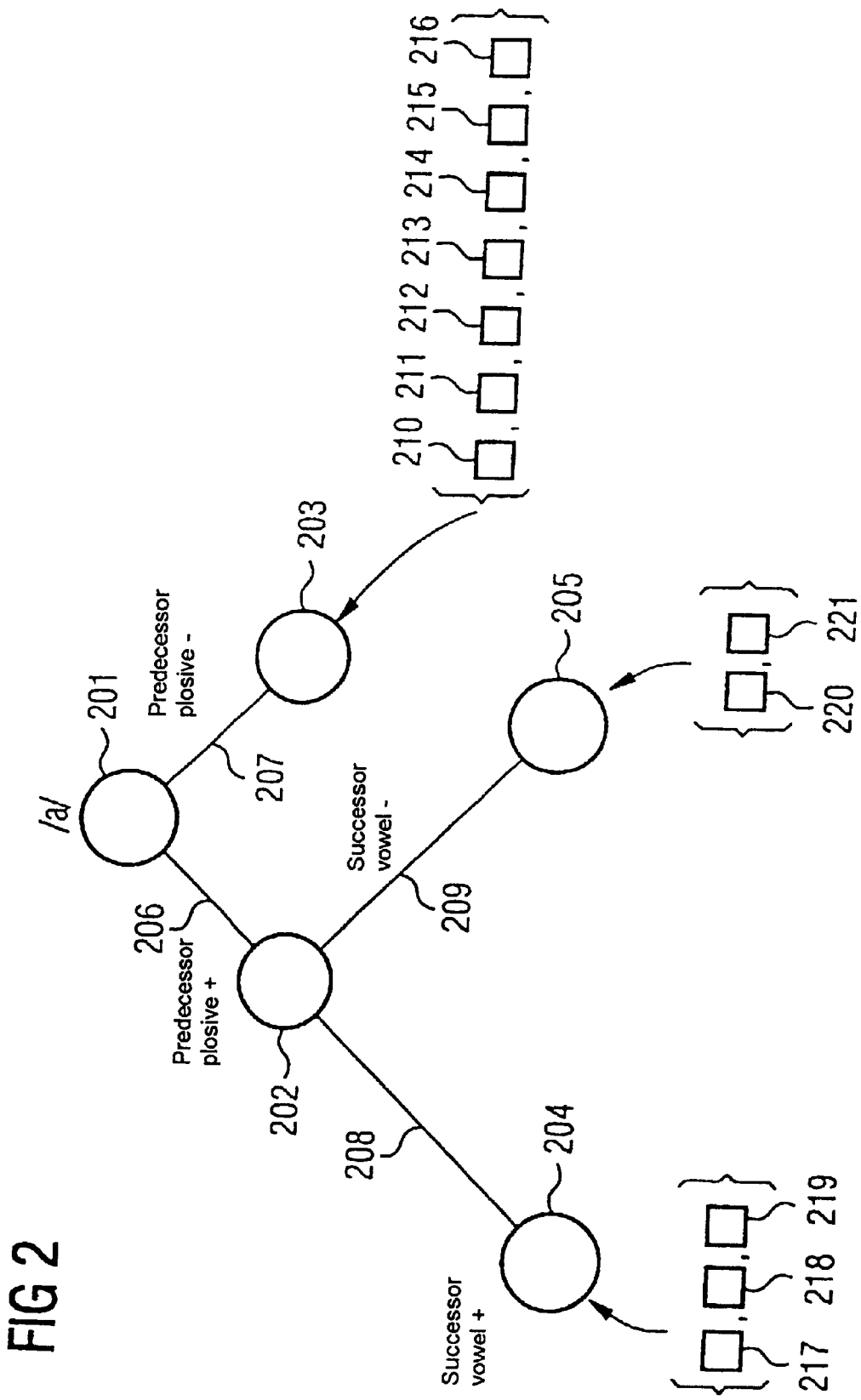
FIG. 2 is a flow chart of a structure.

Referring now to the figures of the drawings in detail and first, particularly to FIG. 2 thereof, there is shown a flow chart, in particular a binary decision tree. The decision tree is only a small part of a much larger system and serves to illustrate the statements already made and made below.

The decision tree includes nodes 201 to 205, of which the node 201 is also referred to as a root and the nodes 203, 204, and 205 are also referred to as leaves of the tree. Furthermore, the tree has edges 206 to 209, along which a decision can be traced. The entire decision tree is constructed by a large number of decisions carried out one after the other.

In the example of FIG. 2, a sound model /a/ (cf. node 201) is taken as a basis, checking for this model whether or not the predecessor sound is a plosive (sound). If the predecessor is a plosive sound, a branch is taken along the edge 206 to the node 202. Otherwise, a path along the edge 207 to the node (leaf) 203 is taken. The node 203 again represents a sound model, to which seven representatives (actual sounds) 210 to 216 are assigned. The speech model in node 203 can be further refined (not represented). Starting from node 202, it is investigated whether or not, in addition to the satisfied condition 206, the successor of the sound /a/ is a vowel. If this is the case, a branch is taken along the edge 208 to node 204, otherwise along the edge 209 to node 205. The node 204 stands for a sound model that contains the representatives 217, 218 and 219; node 205 stands for a sound model that contains the representatives 220 and 221. The sizes of the sets of representatives in FIG. 2 are for illustrative purposes. Dependent on the actual application, sound models that have fewer than, for example, five (5) representatives cannot be meaningfully used.

Figure 3:
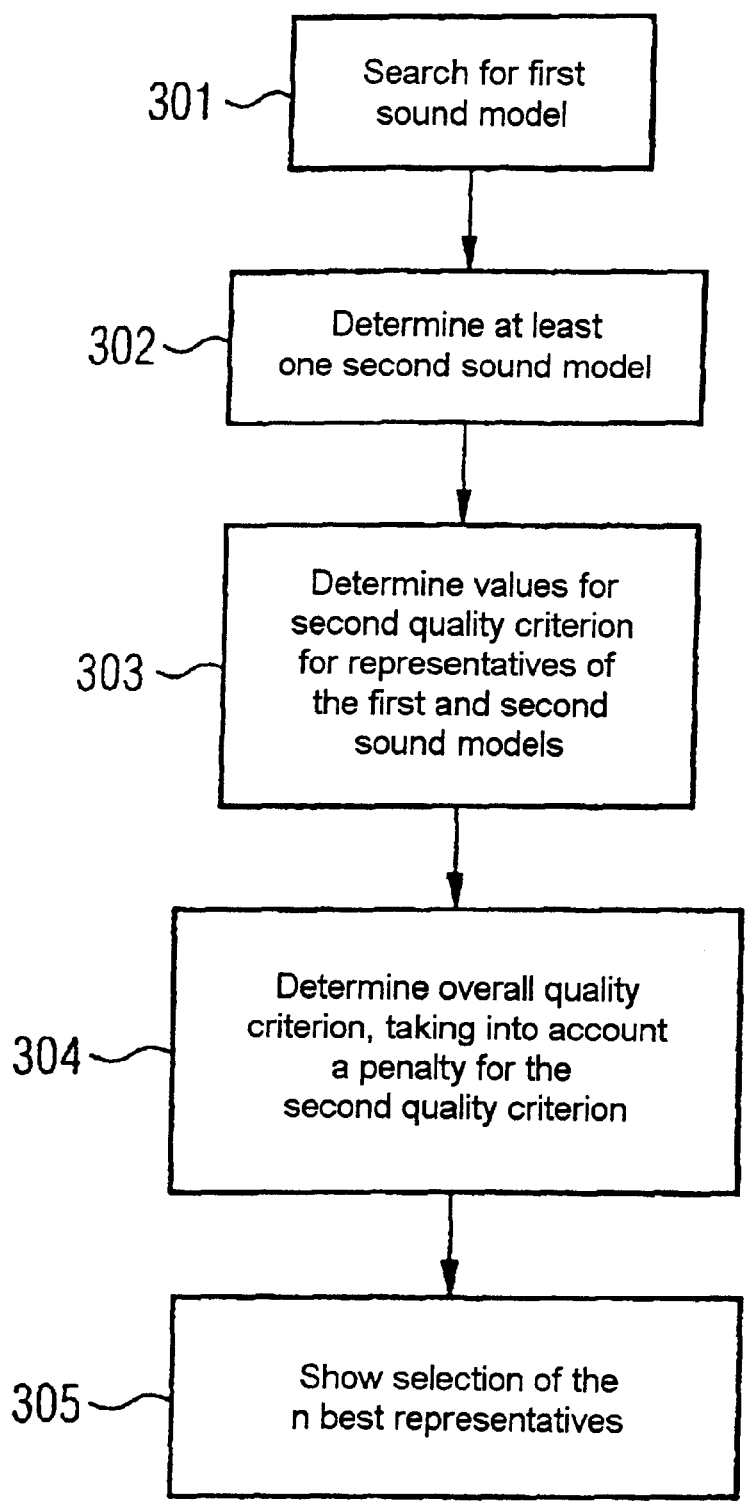
FIG. 3 is a flow chart showing a method for producing or determining a representative sound.

In FIG. 3, a method for producing a sound is represented in a flow chart. The sound is produced based on a structure (in particular on the basis of the binary decision tree represented in FIG. 2). The structure has a set of sound models, each of which has at least one representative for the modeled sound. In a step 301, a first sound model is determined in the structure. The first sound model has an adequate first quality criterion with regard to the sound to be produced. "Adequate" in this context means in particular that a comparison with a predetermined threshold value was positive. Dependent on a characteristic state criterion of the structure (in particular a distance within the structure) at least one second sound model is determined (see step 302). For representatives of the first and the at least one second sound model, a further quality criterion is in each case determined in a step 303, it being possible for the second quality criterion to comprise a number of subcriteria. In a step 304, an overall quality criterion is determined, with a penalty for the second quality criterion being taken into account. The at least one second sound model selected by the characteristic state criterion is given the penalty, because originally according to the structure the search was ended with the first sound model. A deviation from this first sound model must bring a significant improvement with regard to the second quality criterion to justify a deviation from the first sound model to the second sound model. In this case, the values for the quality criteria are preferably determined based on the representatives themselves. A value for the deviation (distance) is based on various assessments. In a step 305, the n best representatives are represented, it being possible to pick out one that is suitable according to the application. In this case, the quality criteria also can be individually weighted, so that each application can determine the representative that is "best" for its purpose for producing the sound.

Figure 4:
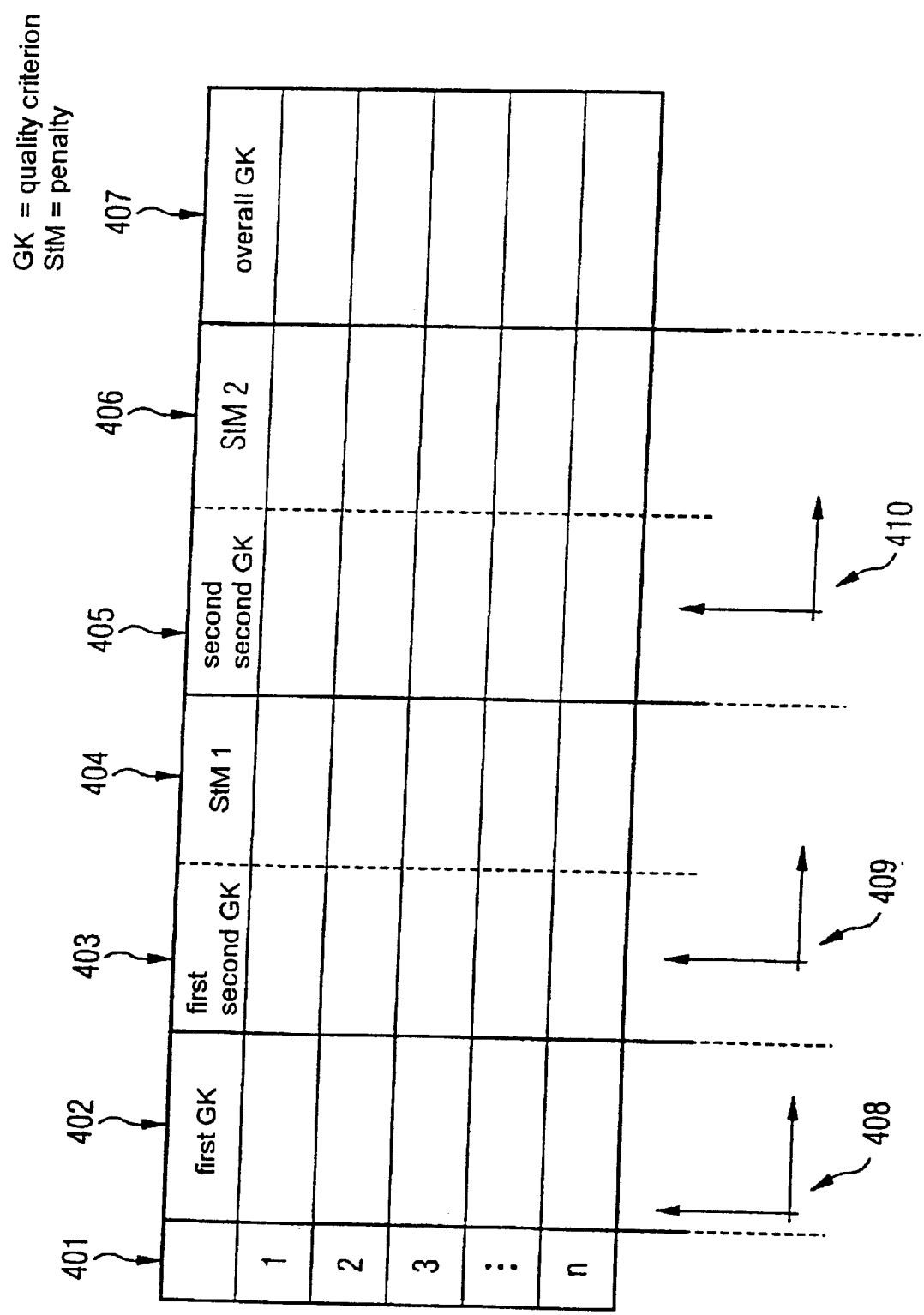
FIG. 4 shows a tabular representation of the method with a selection of representatives.

FIG. 4 shows a list presenting the representatives 1,2, . . . , n (cf. column 401) obtained. Each representative 401 is assessed on the basis of the first quality criterion (GK) 402, a first second quality criterion 403 with associated penalty StM1 404 and a further second quality criterion 405 with associated penalty StM2 406 to give an overall quality criterion 407. The assessment itself takes place by applying fuzzy logic 408, 409, and 410, which provides comparability of the values entered in the columns 402 to 406. The individual fuzzy characteristic lines 408 to 410 allow a selective weighting of the quality criteria. Alternatively, the penalty 404 or 406 may also be incorporated in the characteristic lines 409 or 410.

Figure 5:
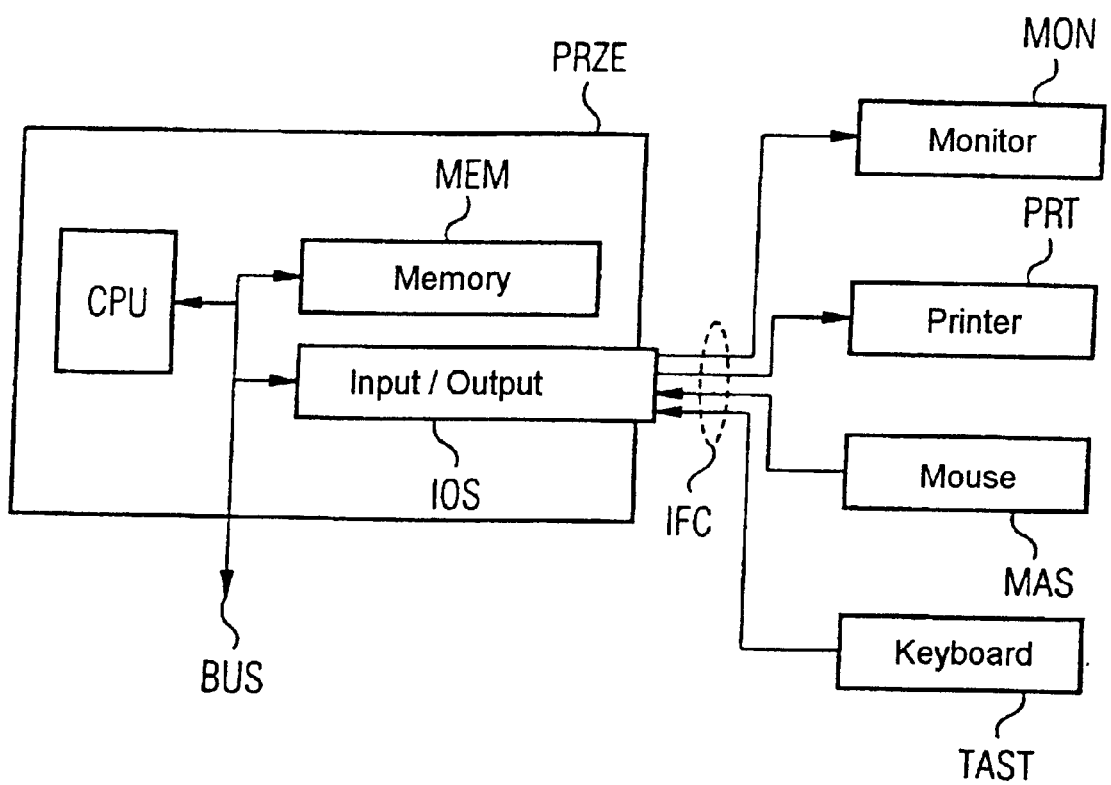
FIG. 5 shows a schematic of a processor unit.

In FIG. 5, a processor unit PRZE is represented. The processor unit PRZE includes a processor CPU, a memory SPE and an input/output interface IOS, which is used in various ways via an interface IFC: a graphical interface allows an output to be viewed on a monitor MON and/or to be printed on a printer PRT. An input takes place via a mouse MAS or a keyboard TAST. The processor unit PRZE also has a data bus BUS. The data bus connects a memory MEM, the processor CPU, and the input/output interface IOS. Furthermore, additional components, for example an additional memory, data storage device (fixed disk), or scanner, can be connected to the data bus BUS.

I claim:

1. A method for determining a representative sound based on a structure, which comprises:

forming, from a sound, a structure having a characteristic state criterion;

providing a set of sound models, each sound model having a representative with a plurality of quality criterion;

determining, in the structure, a first sound model from the set of sound models matching a first quality criterion;

determining a second sound model from the set of sound models depending on the characteristic state criterion of the structure;

forming an overall quality criterion for each representative by assessing representatives of the first and the second sound model with regard to a second quality criterion in addition to the first quality criteria; and determining a representative having an adequate overall quality criterion with regard to the first and second quality criteria as a representative sound.

2. The method according to claim 1, which further comprises providing a representative of the second sound model, resulting from the characteristic state criterion, with a lower quality than a representative of the first sound model.

3. The method according to claim 1, which further comprises using an arithmetic combination of the quality criteria as the overall quality criterion.

4. The method according to claim 1, in which further comprises determining a best representative, with regard to the overall quality criterion, as the representative sound.

5. The method according to claim 1, wherein the structure is a tree structure.

6. The method according to claim 1, in which the structure is constructed using at least one of the following criteria:
linguistic criteria;
articulatory criteria; and
phonetic criteria.

7. The method according to claim 1, which further comprises forming the sound as a phoneme.

8. The method according to claim 1, which further comprises forming the sound as a biphone.

9. The method according to claim 1, which further comprises forming the sound as a triphone.

10. The method according to claim 1, which further comprises forming the sound as a syllable.

11. The method according to claim 1, which further comprises forming the sound as a combination of syllables.

12. The method according to claim 1, which further comprises forming the sound as a word.

13. The method according to claim 1, which further comprises forming the sound as a combination of words.

14. The method according to claim 13, which further comprises constructing the structure based on a context criteria of the sound within the combination of sounds.

15. The method according to claim 1, which further comprises basing the characteristic state criterion of the structure on a predetermined distance within the structure.

16. The method according to claim 1, wherein at least one of the sound models is a hidden Markov model.

17. The method according to claim 1, which further comprises selecting a plurality of representatives, the plurality of representatives being best suited for determining the representative sound based on their respective overall quality criterion.

18. The method according to claim 1, which further comprises determining the first sound model when further searching of the structure stops improving the first quality criterion.

19. The method according to claim 1, which further comprises determining the first sound model when fewer representatives are available than are required for determining the representative sound with respect to a sound model with a possibly better first quality criterion.

20. The method according to claim 1, which further comprises assessing each second quality criterion with fuzzy logic.

21. The method according to claim 1, wherein the overall quality criterion is adequate for determining the representative sound whenever a predetermined threshold value for the overall quality criterion is reached.

22. A method for speech processing by determining a representative sound based on a structure, which comprises:
forming, from a sound, a structure having a characteristic state criterion;
providing a set of sound models, each sound model having a representative with a plurality of quality criteria;
determining, in the structure, a first sound model from the set of sound models matching a first quality criterion;
determining a second sound model from the set of sound models depending on the characteristic state criterion of the structure;
forming an overall quality criterion for each representative by assessing representatives of the first and the second sound model with regard to a second quality criterion in addition to the first quality criterion; and
determining a representative having an adequate overall quality criterion with regard to the first and second quality criteria as a representative sound.

23. A method for synthesizing speech by determining a representative sound based on a structure, which comprises:
forming, from a sound, a structure having a characteristic state criterion;
providing a set of sound models, each sound model having a representative with a plurality of quality criterion;
determining, in the structure, a first sound model from the set of sound models matching a first quality criterion;
determining a second sound model from the set of sound models depending on the characteristic state criterion of the structure;
forming an overall quality criterion for each representative by assessing representatives of the first and the second sound model with regard to a second quality criterion in addition to the first quality criterion; and
determining a representative having an adequate overall quality criterion with regard to the first and second quality criteria as a representative sound.

24. A configuration, comprising a processor unit for determining a representative sound based on a structure including a set of sound models, each sound model having at least one representative for a modeled sound, said processor unit:
determining, in the structure, a first sound model from the set of sound models by matching a first quality criterion;
determining at least one second sound model from the set of sound models, dependent on a characteristic state criterion of the structure;
assessing representatives of the first and the at least one second sound model in addition to the first quality criterion with regard to a second quality criterion; and
selecting a representative sound by determining at least one representative having an adequate overall quality criterion with regard to the first and second quality criteria.

* * * * *